US011143392B2

(12) United States Patent
Jiang

(10) Patent No.: US 11,143,392 B2
(45) Date of Patent: Oct. 12, 2021

(54) HUMIDITY ALARM MONITORING SYSTEM FOR STAGE LIGHT

(71) Applicant: GUANGZHOU HAOYANG ELECTRONIC CO., LTD., Guangdong (CN)

(72) Inventor: Weikai Jiang, Guangdong (CN)

(73) Assignee: GUANGZHOU HAOYANG ELECTRONIC CO., LTD (CN), Guangdong (CN)

(*) Notice: Subject to any disclaimer, the term of this patent is extended or adjusted under 35 U.S.C. 154(b) by 0 days.

(21) Appl. No.: 16/778,405

(22) Filed: Jan. 31, 2020

(65) Prior Publication Data

US 2020/0193796 A1 Jun. 18, 2020

Related U.S. Application Data

(63) Continuation of application No. PCT/CN2018/097238, filed on Jul. 26, 2018.

(30) Foreign Application Priority Data

Jul. 31, 2017 (CN) ......................... 201720943058.9

(51) Int. Cl.
*F21V 23/04* (2006.01)
*H05B 47/20* (2020.01)
(Continued)

(52) U.S. Cl.
CPC .......... *F21V 23/0442* (2013.01); *F21V 25/00* (2013.01); *G08B 21/20* (2013.01);
(Continued)

(58) Field of Classification Search
CPC ...... G08B 21/20; H05B 47/20; H05B 47/105; F21V 25/00; F21V 23/0442; F21W 2131/406
(Continued)

(56) References Cited

U.S. PATENT DOCUMENTS 6,621,239 B1 * 9/2003 Belliveau ............ H05B 47/155 315/312
7,458,690 B2 * 12/2008 Childers ................ G03B 21/16 353/85
(Continued)

FOREIGN PATENT DOCUMENTS

CN 102254404 A 11/2011
CN 202134089 U 2/2012
(Continued)

*Primary Examiner* — Emily C Terrell
(74) *Attorney, Agent, or Firm* — Muncy, Geissler, Olds & Lowe, P.C.

(57) ABSTRACT

The present invention discloses a humidity alarm monitoring system for a stage light configured to monitor a closed chamber of the stage light comprises a humidity detection module located inside the chamber for detecting the humidity of the chamber;
a light control module connected to the humidity detection module; and a light source control module and a display module which are connected to the light control module. According to the present invention, the humidity alarm monitoring system, which is simple in structure and convenient in operation, can provide alarm and protection functions while monitoring the humidity condition of the stage light, can overcome the problems of existing stage lights such as damaging the electronic components due to excessive humidity, can improve the reliability of the light, and can also prolong the service life of the light.

5 Claims, 2 Drawing Sheets

(51) Int. Cl.
*F21V 25/00* (2006.01)
*G08B 21/20* (2006.01)
*H05B 47/105* (2020.01)
*F21W 131/406* (2006.01)

(52) U.S. Cl.
CPC ........... *H05B 47/105* (2020.01); *H05B 47/20* (2020.01); *F21W 2131/406* (2013.01)

(58) Field of Classification Search
USPC .......................................................... 340/602
See application file for complete search history.

(56) References Cited

U.S. PATENT DOCUMENTS

| | | | | |
|---|---|---|---|---|
| 8,854,220 | B1* | 10/2014 | Smith | H01J 31/50 340/604 |
| 2006/0126025 | A1* | 6/2006 | Belliveau | H05B 47/18 353/31 |
| 2006/0150817 | A1* | 7/2006 | DeGuiseppi | B01D 53/263 96/108 |
| 2014/0356005 | A1* | 12/2014 | Sakamoto | G03G 15/80 399/44 |
| 2015/0179037 | A1* | 6/2015 | Ren | G01L 7/18 340/522 |
| 2016/0095188 | A1* | 3/2016 | Verberkt | H05B 47/11 315/151 |
| 2017/0184288 | A1* | 6/2017 | Owens | F21V 19/003 |
| 2018/0042087 | A1* | 2/2018 | Keating | H05B 45/50 |

FOREIGN PATENT DOCUMENTS

| | | | |
|---|---|---|---|
| CN | 204592987 | U | 8/2015 |
| CN | 204756629 | U | 11/2015 |
| CN | 205208437 | U | 5/2016 |
| CN | 106402754 | A | 2/2017 |
| CN | 106604457 | A | 4/2017 |
| CN | 206347410 | U | 7/2017 |
| CN | 207235186 | U | 4/2018 |

* cited by examiner

HUMIDITY ALARM MONITORING SYSTEM FOR STAGE LIGHT

CROSS REFERENCE TO RELATED APPLICATIONS

The present application is a continuation of International Application No. PCT/CN2018/097238, filed on Jul. 26, 2018, which claims priority from Chinese Patent Application No. 201720943058.9 filed on Jul. 31, 2017, all of which are hereby incorporated herein by reference.

TECHNICAL FIELD

The invention relates to the technical field of stage lights, in particular to a humidity alarm monitoring system for a stage light.

BACKGROUND

Stage lights begin to be widely applied to outdoor scenes. The inside of the light without good sealing performance can cause high humidity, and the electronic device is corroded and fails to work, so that the power supply and control devices and the like of the stage light cannot work normally, and even electric shock accidents will occur to people during the use of the light when a large amount of water enters the inside of the light. Therefore, the humidity of the inside of the light must be guaranteed to be normal.

Currently, the waterproof method of the stage light includes being waterproof by the light itself or through a protective cover, so that the water flow can be prevented from entering the inside of the light. However, it may not absolutely ensure that no water enters the inside of the light when the light is placed in a wet or humid environment. Then the electronic device is easy to be damaged and fails to work if the problem is not handled in time. No technology that can monitor the humidity inside the light has been prevented in the current technical field of stage lights.

SUMMARY

In order to overcome the problem of current waterproof stage lights that the potential danger of entering the inside of the light by water vapor cannot be handled in time, the invention provides a humidity alarm monitoring system for the stage light. The invention can monitor the humidity inside the stage light at any time, display the humidity condition of the light on the display module of the light, and feeds back the humidity condition to the total control system. The total control system of the light controls a light alarm, starts a dehumidification system, or reminds a worker to maintain the failed light.

According to the present invention, a humidity alarm monitoring system for a stage light includes a chamber of a monitored stage light in which the chamber is in a closed structure, and a humidity detection module located inside the closed chamber. The humidity detection module includes a humidity sensor for detecting the humidity condition inside the closed chamber of the stage light, and the detected signal is converted to an electrical signal by the humidity sensor. The humidity detection module also includes a sub-controller connected to the humidity sensor for receiving the electrical signal transmitted by the humidity sensor. The inside of the sub-controller includes an analog-digital conversion module that converts the electrical signal transmitted by the humidity sensor to a digital signal and transmits the digital signal to the light control module.

The light control module is located inside the light body and is used to receive a humidity digital signal transmitted by the sub-controller.

The original hardware of the inner system of the stage light can be used by the above modules except the humidity sensor, which can reduce the space occupied by the system, and lower the cost and the risk of electromagnetic interference.

The humidity alarm monitoring system for the stage light further includes an input and output module, in which the input and output module includes a setting module and a display module.

The setting module is used to preset humidity thresholds and transmitting preset humidity thresholds to the light control module. The range of the humidity values required by the inside of the monitored chamber is different since the light source and the device material of the light and other factors are different, so that the preset humidity threshold needs to be input as a judging criterion.

The humidity inside the monitored chamber slightly exceeds the standard and the device inside the monitored chamber still can continue to work when a first humidity threshold is preset and the humidity exceeds the first humidity threshold.

The humidity inside the monitored chamber severely exceeds the standard and the device inside the monitored chamber cannot operate well and the stage light must stop running when a second humidity threshold is preset and is higher than the first humidity threshold and the humidity exceeds the second humidity threshold.

The light control module judges whether the humidity value inside the monitored chamber exceeds the first humidity threshold and the second humidity threshold according to the received humidity digital signal, and feeds back the processed humidity state information to the total control system while outputting a control instruction.

Due to different manufacturing time, materials and other reasons, the stage lights have different degrees of tolerance to humidity. The setting module adopted by the present system can set different humidity thresholds for the lights with different requirements, and the applicability of the system can be improved.

The total control system can output the control signal to control the light control module and can receive the humidity state information fed back by the light control module at the same time, judges whether to output alarm information or not according to the humidity state, and prompts the user to schedule light maintenance. The total control system can control a plurality of lights simultaneously and receive the humidity state information fed back by the plurality of lights.

All lights can be monitored by the total control system as a whole when the number of stage lights is large, thereby reducing manpower and material resources.

The light control module controls the display module and a light source driver.

The display module can display humidity information and display alarm information after the data exceeds the preset humidity threshold.

The light source driver controls the state of the light source to be turned on or off, and controls the light source to be turned off when the humidity value exceeds the second humidity threshold.

Although the light source of the stage light is high in cost, the function of the system to set and control the light source to be turned off can stop loss in time and reduce the risk of damaging the light source.

Preferably, the humidity sensor can adopt a general resistive or capacitive moisture-sensitive element.

Preferably, the number of the humidity sensors can be increased appropriately to prevent the humidity sensors from being damaged which causes that the humidity condition information cannot be read normally.

Compared with the prior art, the present invention, which is simple in structure and convenient in operation, can provide alarm and protection functions while monitoring the humidity condition of the stage light, can overcome the problems of existing stage lights such as damaging the electronic components due to excessive humidity, can improve the reliability of the light, and can prolong the service life of the light.

EMBODIMENTS

Figure 1:
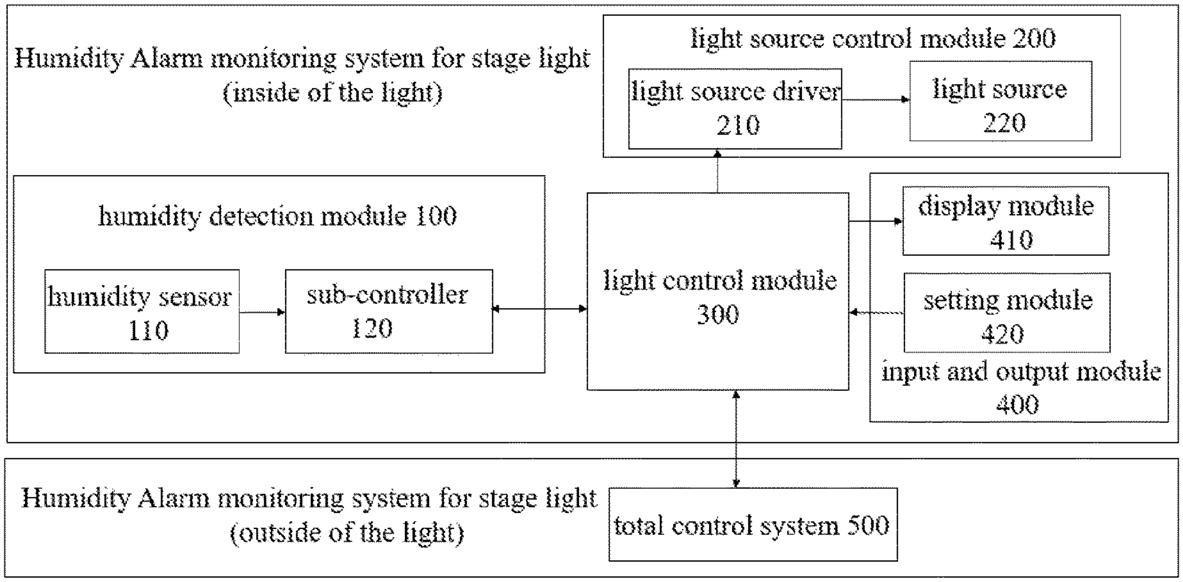
FIG. 1 is a functional block diagram in Embodiment 1 of the present invention.

The present invention will be further described in detail below with reference to the accompanying drawings and embodiments in order to clarify the objectives, technical solutions and advantages of the present invention. In order to better illustrate the embodiments, certain components of the drawings may be omitted, enlarged or reduced, and do not represent the dimensions of the actual product. It will be understood for those skilled in the art that some known structures and descriptions thereof in the drawings may be omitted.

Embodiment 1

As shown in FIG. 1, a humidity alarm monitoring system a stage light includes a humidity detection module 100, a light source control module 200, a light control module 300, an input and output module 400, and a total control system 500.

The humidity detection module 100 includes a humidity sensor 110 and a sub-controller 120 which is connected to the humidity sensor 110. The sub-controller 120 is also connected to the light control module 300 for data transmission with each other. The light source control module 200 includes a light source driver 210 and a light source 220 controlled by the light source driver 210. The light source driver 210 is connected to the light control module 300 and can receive instructions issued by the light control module 300. The light source control module 200 thus can adjust the working state thereof according to the humidity data of the light control module 300. The input and output module 400 includes a display module 410 that can receive instructions issued by the light control module 300, and a setting module 420 that can input information to the light control module. The total control system 500 is located outside the light, and usually is a general console in a stage control room. The total control system 500 is connected to the light control module 300, can receive information fed back by the light control module 300, and can also issue instructions to the light control module 300.

The operating principle of Embodiment 1 is as follows.

A relevant operator presets a first humidity threshold and a second humidity threshold by the setting module 420, in which the second humidity threshold is higher than the first humidity threshold. The humidity inside the monitored chamber is in an abnormal state and the device inside the monitored chamber can still continue to operate when the detected humidity exceeds the first humidity threshold, and the device inside the monitored chamber cannot operate well and the stage light must stop running when the detected humidity exceeds the second humidity threshold.

The humidity sensor 110 is placed inside the monitored chamber to detect the humidity inside the monitored chamber. The detected humidity analog signal is converted to a humidity electrical signal, and the electrical signal is transmitted to the sub-controller 120 which then converts the received humidity electrical signal to a humidity digital signal.

Figure 2:
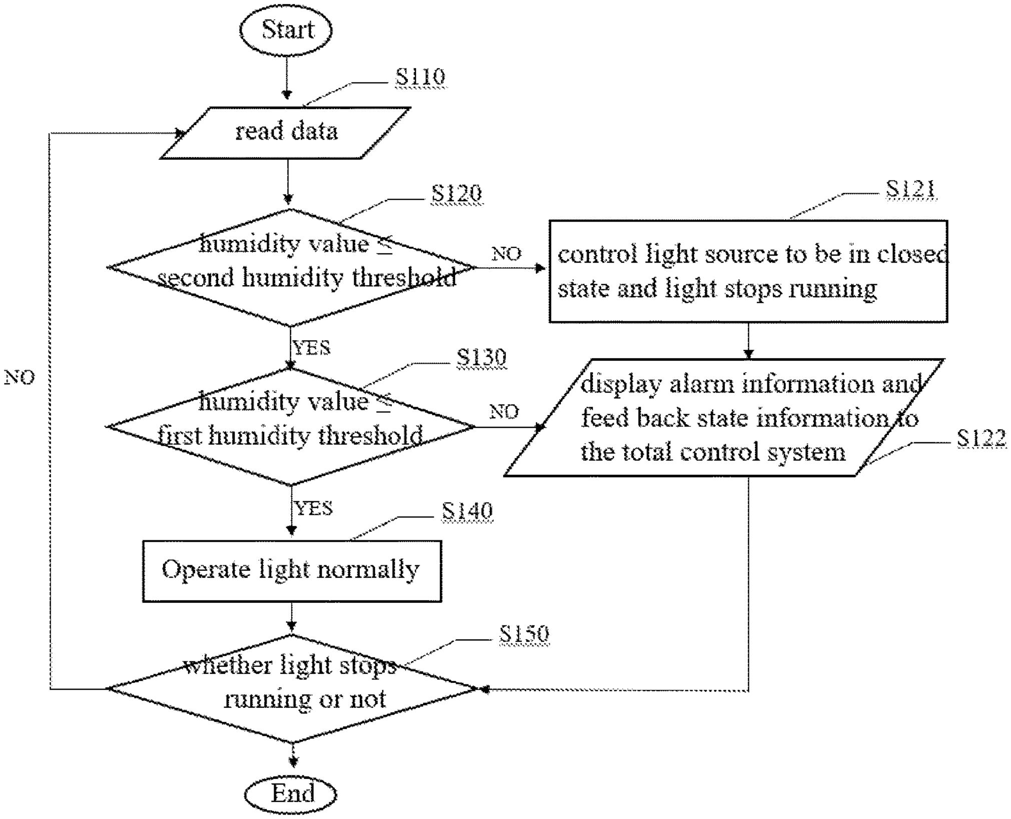
FIG. 2 is a flow chart of a humidity alarm monitoring system for a stage light in Embodiment 1 of the present invention.

As shown in FIG. 2, the data processing of the humidity alarm monitoring system in a normal working state has three cases as follows.

Case 1

S110. The light control module 300 reads the humidity digital signal emitted by the sub-controller 120.

S120. The light control module 300 compares the humidity digital signal with the second humidity threshold.

S121. If the humidity digital signal exceeds the second humidity threshold, the light control module 300 issues an instruction to the light source driver 210 to turn off the light source 220, and the light source driver 210 controls the light source 220 to be in a closed state. Meanwhile, the light control module 300 controls the light to stop running.

S122. The light control module 300 controls the display module 410 to display alarm information, such as "Waterproof failure at X site, please schedule maintenance", and feeds back the humidity state information to the total control system 500 and informs a user about noticing the state of the equipment, in which the X is the name of the monitored chamber.

S150. The light control module 300 determines the operating state of the light and the light stops running at this time, and the detection is finished.

Case 2

S110. The light control module 300 reads the humidity digital signal emitted by the sub-controller 120.

S120. The light control module 300 compares the humidity digital signal with the second humidity threshold.

S130. If the humidity digital signal is smaller than or equal to the second humidity threshold, the light control module 300 compares the humidity digital signal with the first humidity threshold.

S122. If the humidity digital signal exceeds the first humidity threshold, the light control module 300 controls the display module 410 to display alarm information, such as "Humidity exceeds standard at X site, please check the light", and feeds back the humidity state information to the total control system 500 and informs the user about noticing the state of the equipment, in which the X is the name of the monitored chamber.

S150. The light control module 300 determines the operating state of the light.

S110. The light still continues to receive the data of the total control system 500 and work at this time, and the light control module 300 rereads the humidity digital signal emitted by the sub-controller 120. The humidity alarm monitoring system runs in real time.

Case 3

S110. The light control module 300 reads the humidity digital signal emitted by the sub-controller 120.

S120. The light control module 300 compares the humidity digital signal with the second humidity threshold.

S130. If the humidity digital signal is smaller than or equal to the second humidity threshold, the light control module 300 compares the humidity digital signal with the first humidity threshold.

S140. If the humidity digital signal is smaller than or equal to the first humidity threshold, the light normally operates.

S150. The light control module 300 determines the operating state of the light.

S110. The light still continues to receive the data of the total control system 500 and work at this time, and the light control module 300 rereads the humidity digital signal emitted by the sub-controller 120. The humidity alarm monitoring system runs in real time.

Embodiment 2

On the basis of Embodiment 1, humidity sensors are provided inside different chambers respectively for monitoring the humidity condition when the number of independent and closed chambers of the monitored light increases.

Figure 3:
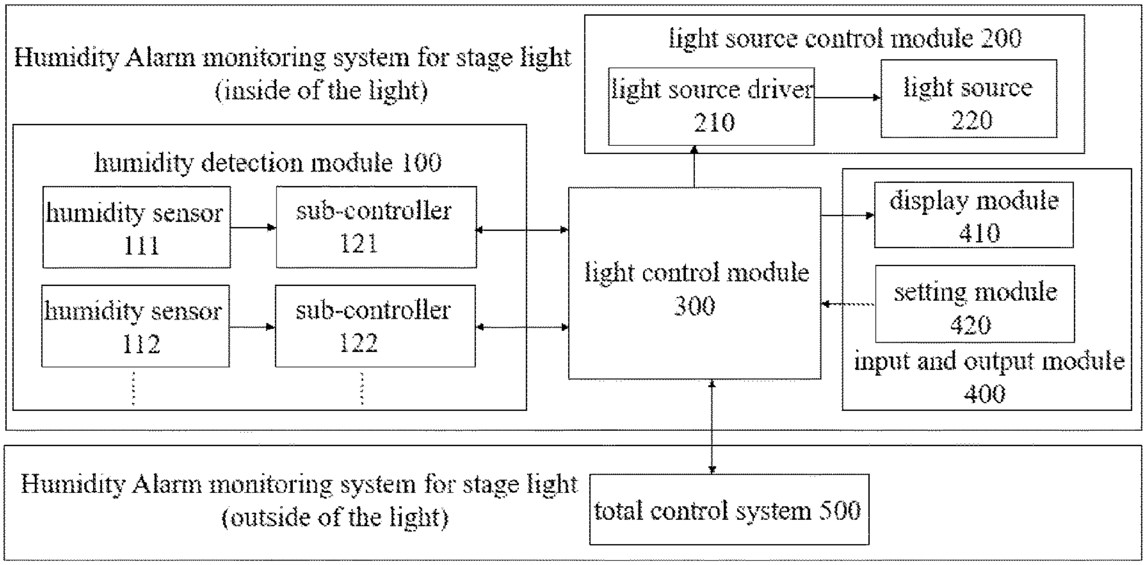
FIG. 3 is a functional block diagram in Embodiment 2 of the present invention.
Figure 4:
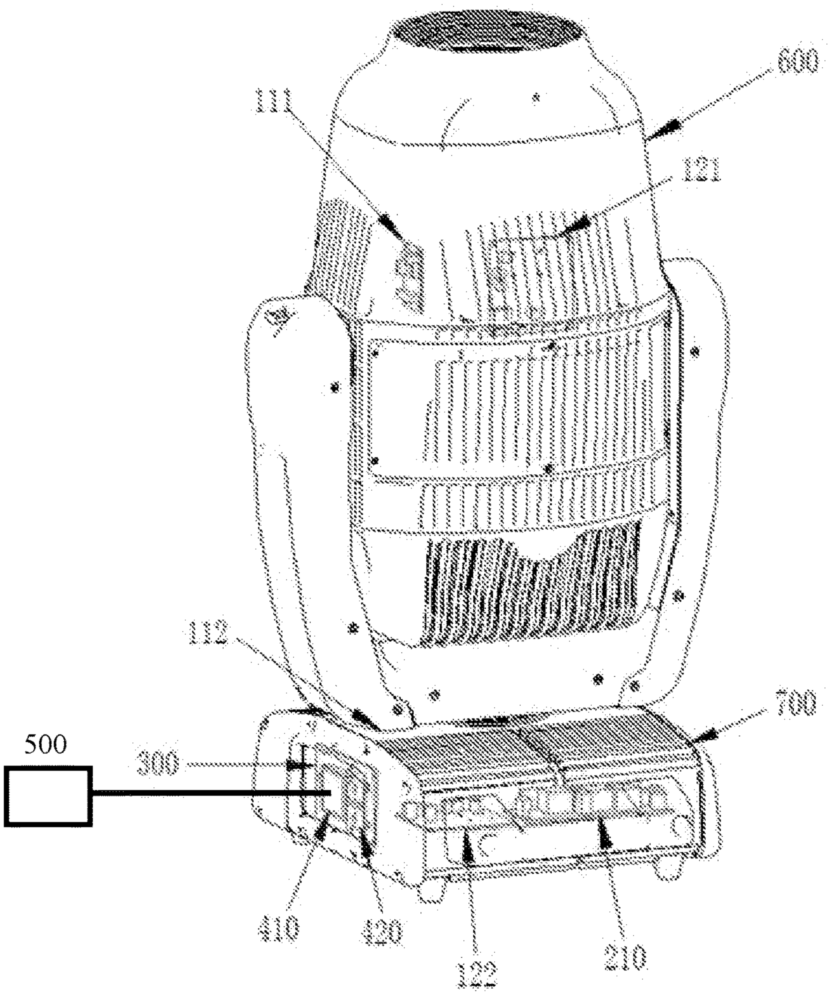
FIG. 4 is a structural schematic view for part of the light in Embodiment 2 of the present invention.

As shown in FIGS. 3 and 4, according to the present embodiment, the humidity alarm monitoring system for the stage light compared with Embodiment 1 includes a humidity detection module 100. The humidity detection module 100 includes a humidity sensor 111, a sub-controller 112 connected to the humidity sensor 111, a humidity sensor 112, and a sub-controller 122 connected to the humidity sensor 112. The sub-controllers 121 and 122 are connected to the light control module 300 respectively for data transmission with each other. The monitored chamber includes a light head 600 and a chassis 700. The light head 600 and the chassis 700 have mutually independent and closed structures.

The light control module 300 reads the humidity digital signals emitted by the sub-controllers 121 and 122 respectively. The data processing in the normal working state in Embodiment 2 has three cases as follows.

Case 1

When any humidity digital signal of the humidity digital signals emitted by the sub-controllers 121 and 122 respectively exceeds the second humidity threshold, the light control module 300 issues the instruction to the light source driver 210 to turn off the light source 220, the light source driver 210 controls the light source 220 to be in the closed state, and the light control module 300 controls the light to stop running. Meanwhile, the light control module 300 controls the display module 410 to display alarm information, such as "Waterproof failure at X site, please schedule maintenance", and feeds back the humidity state information to the total control system 500 and informs the user about noticing the state of the equipment, in which the X is the name of the monitored chamber. In Embodiment 2, the X may be the light head 600 or the chassis 700, or the light head 600 and the chassis 700. After the above steps are completed, the light control module 300 determines the operating state of the light and the light stops running at this time, and the detection is finished.

Case 2

When both the humidity digital signals emitted by the sub-controllers 121 and 122 respectively are smaller than or equal to the second humidity threshold while any humidity digital signal of both the humidity digital signals exceeds the first humidity threshold, the light control module 300 controls the display module 410 to display alarm information, such as "Humidity exceeds standard at X site, please check the light", and feeds back the humidity state information to the total control system 500 and informs the user about noticing the state of the equipment, in which the X is the name of the monitored chamber. In Embodiment 2, the X may be the light head 600 or the chassis 700, or the light head 600 and the chassis 700. After the above steps are completed, the light control module 300 determines the operating state of the light, the light still continues to receive the data of the total control system 500 and work at this time, and the light control module 300 rereads the humidity digital signals emitted by the sub-controllers 121 and 122. The humidity alarm monitoring system for the stage light runs in real time.

Case 3

The light normally operates when both the humidity digital signals emitted by the sub-controllers 121 and 122 respectively are smaller than or equal to the first humidity threshold. The light control module 300 determines the operating state of the light. The light still continues to receive the data of the total control system 500 and work at this time, and the light control module 300 rereads the humidity digital signals emitted by the sub-controllers 121 and 122. The humidity alarm monitoring system for the stage light runs in real time.

Further, the humidity alarm monitoring system for the stage light can increase the number of humidity sensors to prevent failure of the whole system caused by failure of a certain humidity sensor.

The embodiments described above only present a few embodiments of the present invention, and are not intended to limit the present invention. Any modification, equivalent substitution or improvement and the like within the spirit and principle of the present invention should be included in the scope of the present invention.

The invention claimed is:

1. A humidity alarm monitoring system for a stage light configured to monitor a humidity of the stage light, the stage light including a light head and a chassis, the light head and the chassis having mutually independent and closed structures, the humidity alarm monitoring system comprising:

a humidity detection module including at least one humidity sensor located inside the light head for detecting the humidity inside the stage light, or located inside the chassis for detecting the humidity inside the chassis;

a light control module connected to the humidity detection module; and a light source control module and a display module which are connected to the light control module and are provided in the chassis, wherein the humidity detection module transmits detected humidity data to the light control module, the display module is used to receive and display alarm information on humidity exceeding standard from the light control module, and the light source control module adjusts a working state thereof according to the humidity data of the light control module, and the display module displays the alarm information to allow a user to view the display alarm information from an exterior of the stage light, the light source control module includes a light source driver controlled by the light control module, and a light source controlled by the light source driver, and the humidity alarm monitoring system further comprising a setting module for presetting a first humidity threshold and a second humidity threshold, wherein the second humidity threshold is greater than the first humidity threshold, the stage light stops running when the monitored humidity data exceeds the second humidity threshold, and the light control module controls the light source driver to turn off the light source.

2. The humidity alarm monitoring system according to claim 1, wherein the humidity detection module further includes at least one sub-controller located inside the light head, the humidity sensor is in one-to-one relationship with the sub-controller, the sub-controller is connected to the light control module, and the sub-controller is used to convert a received humidity electrical signal to a humidity digital signal.

3. The humidity alarm monitoring system according to claim 2, wherein the humidity sensor adopts a general resistive or capacitive moisture-sensitive element.

4. The humidity alarm monitoring system according to claim 1, wherein the light control module controls the display module to display first alarm information when the monitored humidity data is greater than the first humidity threshold and smaller than or equal to the second humidity threshold, and when the monitored humidity data is greater than the second humidity threshold, the light control module controls the display module to display second alarm information, and the first alarm information and the second alarm information display a name of the light head or the chassis to be monitored and level information on the monitored humidity data exceeding the standard.

5. The humidity alarm monitoring system according to claim 1, further comprising a total control system located outside the stage light, wherein the total control system is configured to simultaneously control a plurality of lights, and receive humidity state information fed back by the plurality of lights; the total control system is further configured to output a control signal to control the light control module, to receive the humidity state information fed back by the light control module at the same time, and determine to output alarm information according to the fed-back humidity state information to inform a user about scheduling light maintenance.

* * * * *